June 20, 1939.  E. C. ANDERSON  2,163,253
RAILWAY TRUCK
Filed June 16, 1937  3 Sheets-Sheet 1

Inventor
Emil C. Anderson
By Rodney Bedell
Attorney

June 20, 1939. E. C. ANDERSON 2,163,253
RAILWAY TRUCK
Filed June 16, 1937 3 Sheets-Sheet 2
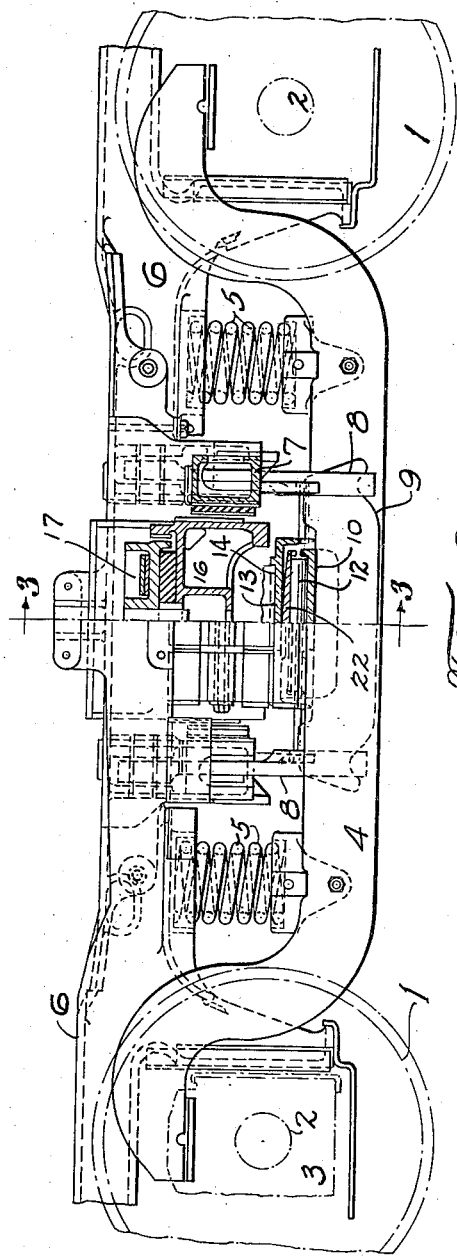
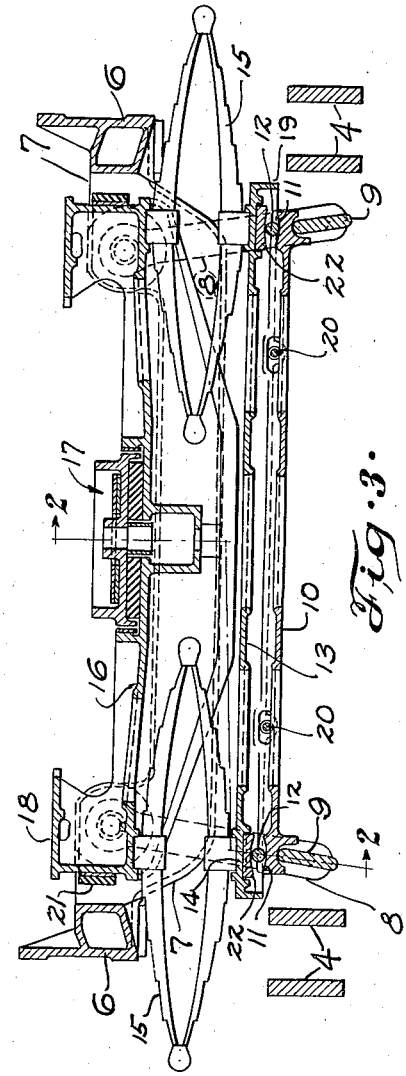
Inventor
Emil C. Anderson
By Rodney Bedell
Attorney June 20, 1939.   E. C. ANDERSON   2,163,253
RAILWAY TRUCK
Filed June 16, 1937   3 Sheets-Sheet 3
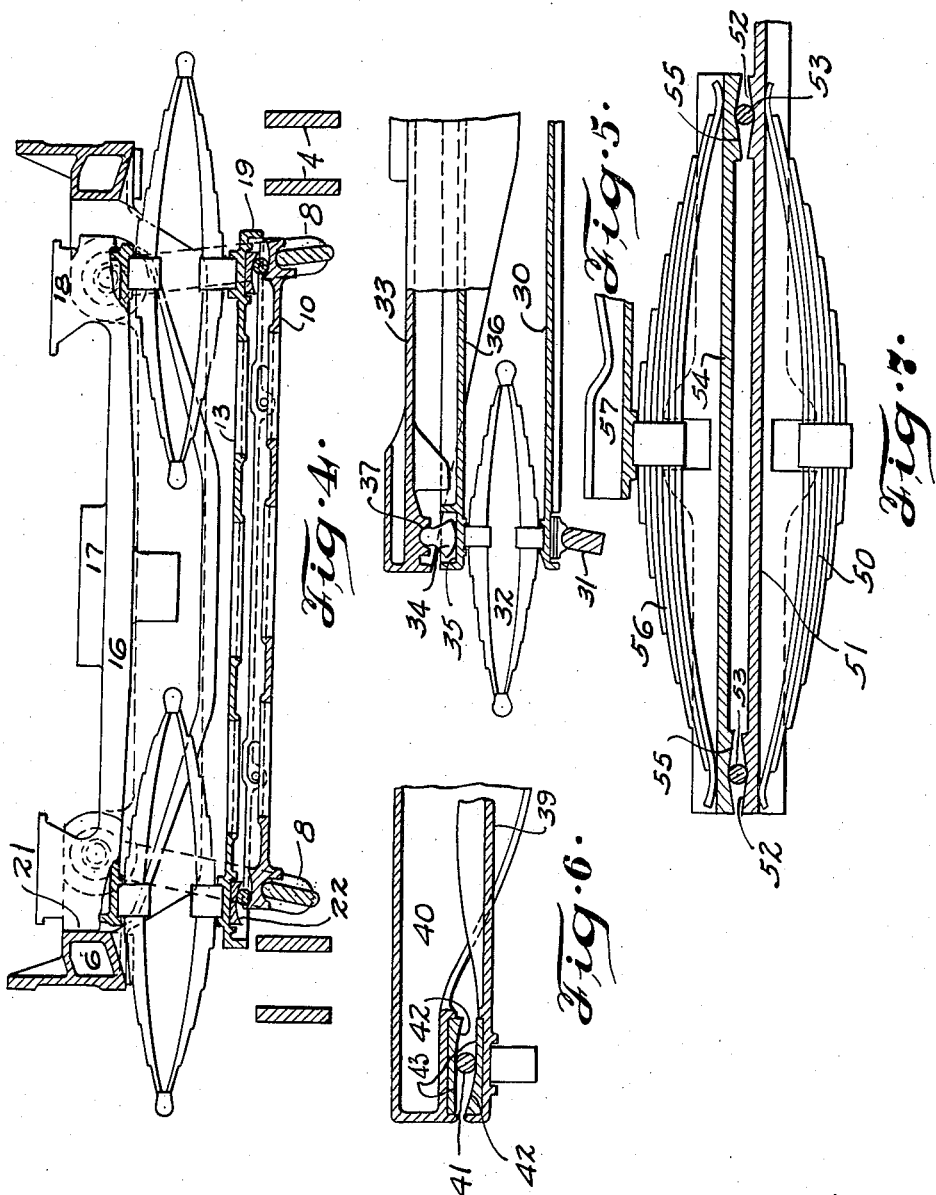
Inventor
Emil C. Anderson
By Rodney Bedell
Attorney Patented June 20, 1939

2,163,253

UNITED STATES PATENT OFFICE 2,163,253

RAILWAY TRUCK

Emil C. Anderson, Downers Grove, Ill.

Application June 16, 1937, Serial No. 148,455

6 Claims. (Cl. 105—186)

The invention relates to railway rolling stock and more particularly to trucks intended primarily for use under passenger train equipment.

As is well known, the treads of railway car wheels are inclined to the wheel axis and the distance between the outside surfaces of the flanges of opposite wheels is less than the distance between the rails. This induces and permits a certain amount of sidewise movement of the wheels and truck. Rail joints and other track irregularities, variations in wear of the wheel tread, draft and buffing forces, and other elements, cause the truck to shift transversely of the track as permitted by the difference in the gauges of the wheel flange and rails, and this lateral oscillation or "hunting" of the truck is transmitted to the body with consequent discomfort to the passengers.

The main object of the invention is to produce easier riding results by reduction or elimination of the tendency of the car body to oscillate laterally of the track due to the above-mentioned action of the trucks.

This object is attained by a combination of elements permitting movement of the truck bolster laterally of the wheel supported frame whereby relatively slight transverse forces will be absorbed by a suitable lateral motion device offering slight resistance to the relative transverse movement of the truck frame and bolster, and heavier transverse forces will be absorbed by another lateral motion device offering increasing resistance to such relative movement.

A familiar type of lateral motion truck includes a transverse plank suspended by swing hangers from the truck frame and supporting elliptic springs which, in turn, carry the truck bolster. In trucks of this type, all of the transverse forces transmitted to the spring plank are, in turn, transmitted to the bolster through the bolster supporting springs, consequently setting up lateral stresses in these springs tending to distort the same and thereby interfering with the intended smooth and even flexing of the springs in a vertical direction. Light weight passenger cars recently introduced, particularly for use in high speed trains, necessitate very soft, great deflection, bolster springs.

It is a further object of the invention to relieve the bolster springs, and particularly the more sensitive springs now being used, of all forces tending towards any distortion of the springs, except the intentional vertical distortion, thereby assuring the smooth and even flexing of the springs and thereby improving the easy riding qualities of the truck.

A detail object of the invention is to improve the riding qualities of lateral motion bolster trucks by utilizing a two-part spring plank comprising in itself means for dissipating some of the lateral forces to which the truck and body are subjected.

Additional objects of the invention are to provide simple, effective, and economical construction of trucks for the intended purpose.

These and other objects as will appear in the detailed explanation below are attained by the structure illustrated in the accompanying drawings, in which—

Figure 2 is in part a side elevation and in part a vertical longitudinal section taken approximately on the line 2—2 of Figure 3.

Figure 3 is a vertical section taken on the line 3—3 of Figure 2.

Figure 1:
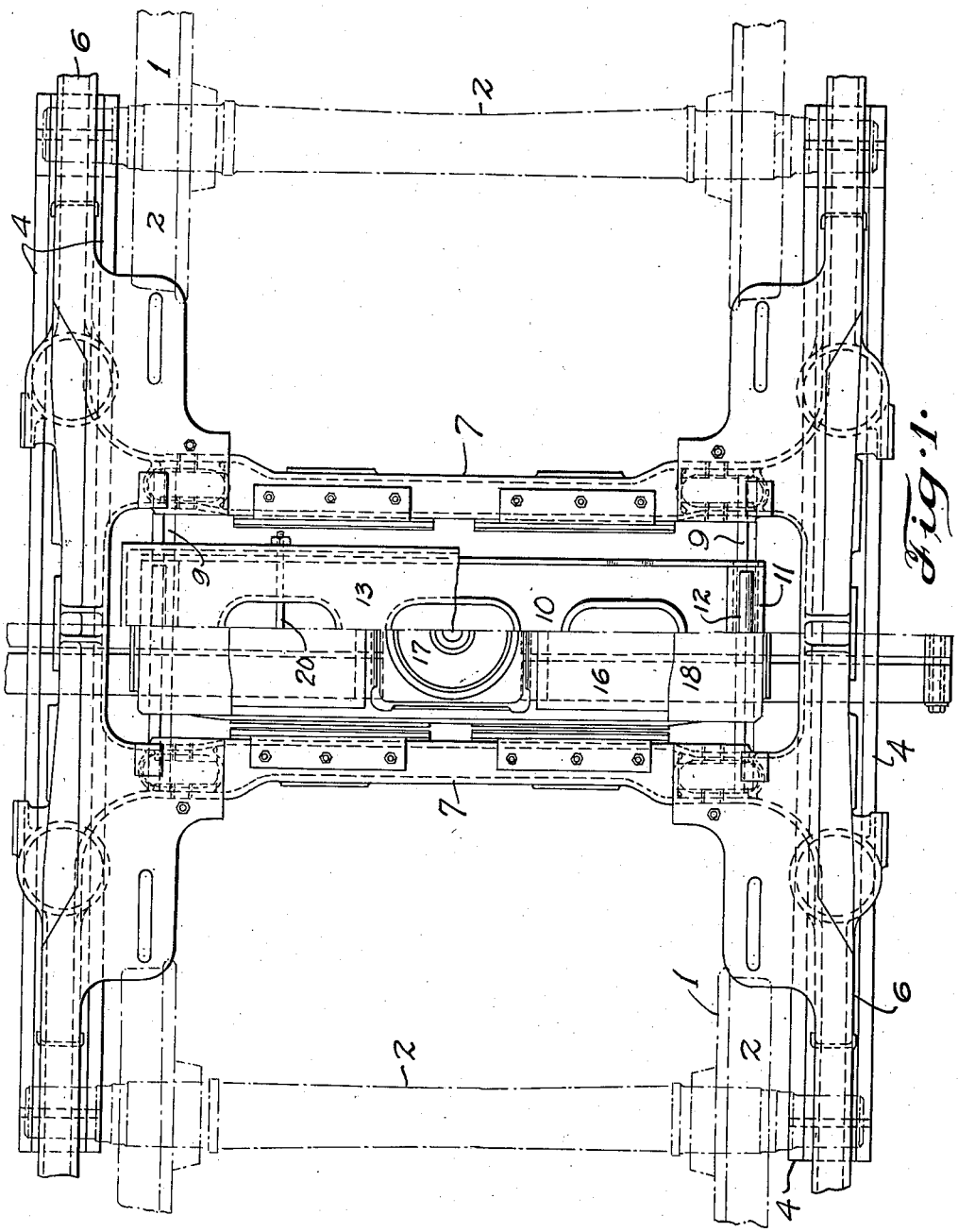
Figure 1 is a top view of a four-wheel car truck, the wheels and axles being shown in dot and dash lines, and a portion of the truck frame being eliminated and some of the truck bolster and other parts being omitted for purposes of clearer illustration.

Figure 4 corresponds to Figure 3 but shows the parts in a different position, namely—that of the extreme lateral motion of the bolster to the left.

Figures 5, 6 and 7 are detailed sections illustrating modifications of some features of the invention.

The truck includes wheels 1, axles 2, journal boxes 3, equalizing bars 4, truck springs 5, and a rigid truck frame 6 including transverse transoms 7, all of familiar construction and arrangement. Pivotally suspended from transoms 7 are pairs of swinging links 8, with cross bars 9 connecting the links of each pair. A two-part spring plank is carried by bars 9 and comprises a lower part 10, extending from side to side of the truck, and provided with upwardly facing seats 11 for anti-friction elements such as rollers 12. The upper part 13 of the spring plank rests upon rollers 12 and is provided with seats 14 for elliptic springs 15 which, in turn, support the truck bolster 16 having any desired center plate structure 17 for supporting the truck load, and also having side bearings 18 functioning in the usual manner to limit tilting of the body on the center plate.

Spring plank members 10 and 13 are shown as channel-shaped castings with their flanges extending towards the other member and overlapped with the flanges thereof, thus limiting relative movement of the spring plank parts longitudinally of the truck. The ends of the member 13 are turned downwardly at 19 and may engage the ends of member 10 to limit relative movement of the members transversely of the truck. Bolts 20 extend through the flanges of the members and prevent their separation vertically. This construction interposes a roller bearing between the spring supporting the load carrying bolster and the member supported by swing hangers from the frame. This roller bearing will tend to function when the frame and bolster are subjected to lateral forces so that the bolster will move a less distance than the frame and even the spring plank lower member 19 which is suspended from the frame. In some instances, according to the design of the roller bearings, the roller supported member, and the springs and bolster thereon, may not move at all. Upon the parts being subjected to increasing lateral forces, the bolster and composite spring plank parts may move as a unit laterally of the frame due to the swinging of hangers 8.

In practice, it is likely the movements of the roller bearings and the swing hangers will occur simultaneously although not necessarily to the same extent, or, at least, will overlap, and the timing of these two movements will depend largely upon the angle at which the swing hangers are placed initially and the inclination of the bearings for the rollers. The inclination of the bearing surfaces for the rollers results in any movement of member 13 relative to member 10 lifting the load and obviously the resistance to the lateral movement increases as the lateral movement progresses. Hence these parts constitute a centering device tending to return the two spring plank parts to their normal relative position as soon as the lateral force tending to shift the parts has been dissipated.

Figure 4 illustrates the various parts in position at the end of an extreme movement of the bolster to one side of the truck. The end wall 19 of member 13 at the right hand side of the truck has contacted with the corresponding end of member 10 and both members have moved as a unit swung with the hangers 8 until the buffer element 21 on the bolster has contacted with the inner wall of frame 6 at the left hand side of the truck. Such a position would only be reached as a result of unusual lateral forces as the main function of the structure described is to dissipate lateral forces before the limits of movement are reached.

Preferably one or both of the bearings for each roller 12 are detachable, as indicated at 22, whereby they may be replaced to compensate for wear or to vary the resistance offered by the rollers to the relative lateral movement of the two parts of the spring plank.

By making one of the bearings for the roller separate from the part in which it is seated, a rocking contact may be provided, as indicated in Figure 2, whereby the pressure on the roller will be transmitted to both ends thereof substantially equally although the load on member 13 is unequally distributed due to variations in the springs or forces tending to twist the member intermediate its ends.

Figure 5 illustrates a modification in which the spring plank 30 is supported by swing hangers (not shown) carrying the cross bar 31 in the usual manner, and the bolster springs 32 are mounted directly upon the spring plank. The relative lateral movement between the bolster 33 and the spring plank is obtained by the insertion of anti-friction elements, such as rockers 34, between the bolster and its spring. Seats 35 for the rockers are formed in the ends of a transverse spring tie 36 extending across the truck and corresponding seats 37 are formed in the underside of the bolster. The lower faces of rockers 34 may be eccentric with the semispherical upper face thereof, or may be disposed concentrically with said upper face according to whether or not it is desired to provide a lifting of the bolster when members 33 and 36 move relative to each other.

Figure 6 illustrates a variation in the bolster support shown in Figure 5 in which the spring tie 39 corresponds to member 36 in Figure 5. If the bolster 40 moves to the left of the position shown, roller 41 will travel along the inclined portions 42 of the bearings, thereby lifting bolster 40. If bolster 40 moves to the right, the roller will travel along the substantially horizontal portions 43 of the bearings and there will be no lifting of that part of bolster 40. Accordingly, in each transverse shifting of the bolster 40 relative to the spring beam 39, one side of the bolster will be lifted and the other side will move substantially horizontally so far as the roller bearing elements of the truck are concerned.

It will be understood that when the bolster and its load shift to the left, there is an increased downward thrust on the left hand spring tending to compress the same and lower that end of the bolster. With the structure just described, the bearing surfaces 42 may be inclined to compensate for such spring compression and thereby maintain a substantially horizontal movement of the bolster with corresponding maintenance of the car floor in level position with increased comfort to the passengers.

Figure 7 illustrates a modification in which the relative movement of the hanger-supported member and the bolster is effected by introducing the equivalent of the two-part spring plank intermediate semi-elliptic springs. With this construction, lower spring 50 will be mounted directly upon the swing hanger cross bar (not shown) and the spring plank member 51 will extend from side to side of the truck, resting upon the ends of spring 50, and providing seats 52 for ball or roller elements 53. Preferably seats 52 would be located above the ends of spring 50. Relatively short saddles 54 at the end portions of member 51 have downwardly facing seats 55 resting upon elements 53 and support the upper semi-elliptic springs 56 which, in turn, carry a bolster 57.

The unfavorable conditions alluded to above are more noticeable with the increased speeds which have been adopted in the operation of passenger trains during the past few years and many efforts have been made, and are being made, to alleviate these conditions.

With each form of the invention illustrated in the drawings and described above, the tendency of the lateral play of the truck to be transmitted to the bolster and body is decreased or eliminated because the ball, roller, or rocker elements in the spring plank are lacking in resistance to opposing lateral forces such as arise from track inequalities, wind forces, the inertia of the bolster and its load, etc. This not only improves the riding qualities of the truck for the reason indicated, but also tends to facilitate the yielding of the springs vertically, as they are intended to function, due to the avoidance of lateral distortion of the springs by the shifting forces. In this connection, it is to be understood that the two-part relatively movable spring plank may be used independently of the swing hangers and other features of the complete structure shown.

It will be obvious to those familiar with truck construction that the proportions of the parts and the detailed construction may be varied substantially without departing from the spirit of the invention and exclusive use of such modifications as come within the scope of the claims is contemplated.

What is claimed is:

1. In a railway truck, a rigid frame, hangers pivotally suspended from said frame to swing transversely of the truck, a beam member carried by said hangers, there being upwardly facing concave arcuate seats on said member, roller elements in said seats, downwardly facing concave arcuate bearings on said elements, the chords of the arcs of said seats and bearings being disposed transversely of the truck, a spacer extending between said bearings at opposite sides of the truck, and bolster structure spring mounted on said bearings.

2. In a lateral motion truck, a truck frame, swing hangers suspended therefrom, a member extending from side to side of the truck and unyieldingly mounted on said swing hangers, anti-friction elements seated on the outer portions of said member and movable thereon transversely of the truck, relatively short bearings spaced from each other longitudinally of said member and resting on respective anti-friction elements, a spacer extending between said bearings at opposite sides of the truck, and a bolster extending from side to side of the truck with its ends spring supported on said bearings, said member offering gradually increasing resistance to movement of said elements and said hangers tending to elevate one end of said member relative to the other end thereof as said member moves transversely of the truck.

3. A railway truck spring plank comprising a pair of members of channel cross section arranged one above the other with the flanges of one channel facing and overlapping the flanges of the other channel, means limiting the relative movement of said channels transversely of the truck, the webs of said channels having opposing seats, and roller bearings mounted therein for supporting the upper channel and the load thereon upon the lower channel, there being structure providing gradually increasing resistance to movement of said upper channel on said bearings.

4. A railway truck spring plank comprising a lower part having downwardly facing bearings for swing hangers, said bearings being spaced from each other longitudinally of said part, and having upwardly facing bearings spaced from each other longitudinally of said part, anti-friction elements on said upwardly facing bearings, and a spring mounting upper part resting on said elements, said upper and lower parts having vertical overlapping flanges with slots extending longitudinally of the parts, there being elements extending through said slots and limiting the relative movement of said parts longitudinally of each other.

5. In a railway truck, a frame, hangers pivotally suspended from said frame at opposite sides of the truck to swing transversely thereof, a spacer between said hangers at opposite sides of the truck, said hangers being inclined from the vertical to provide substantial initial resistance to swing movement, roller seats carried by said hangers, rollers arranged on said seats to roll transversely of the truck relative to said hangers, said seats being shaped to offer no initial resistance to movement of said rollers, a spring carrier mounted on said rollers and movable therewith, springs thereon, a spacer between said carriers at opposite sides of the truck, and a truck bolster carried by said springs.

6. In a railway truck, a frame, swing hangers pivotally suspended from opposite sides of said frame, a transverse beam carried by said swing hangers, anti-friction elements on said beam in spaced relation transversely of said truck, a transverse member on said elements, springs on said member in spaced relation transversely of said truck, a bolster on said springs, said beam and member being adapted to move laterally of the truck relative to each other, and means adapted to limit such lateral movement, said beam and member being so arranged that said elements will tend to keep said beam and member centered and will offer no initial resistance to relative movement of said beam and member from a normal centered position, but will provide increasing resistance as such movement occurs.

EMIL C. ANDERSON.